July 1, 1969   O. S. FREDERIKSEN   3,452,581
MACHINE FOR BENDING TUBES OR RODS
Filed Sept. 23, 1966   Sheet 1 of 2
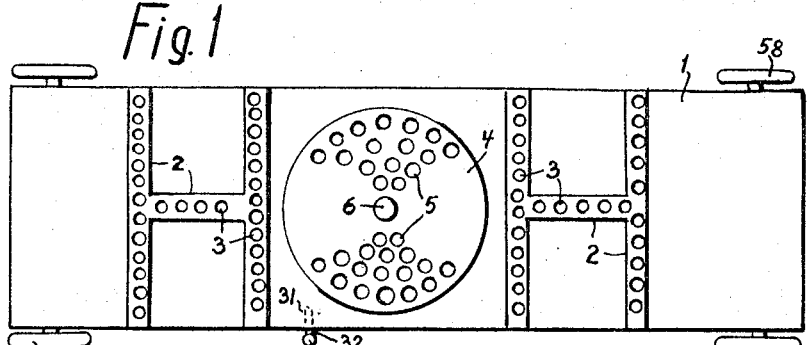
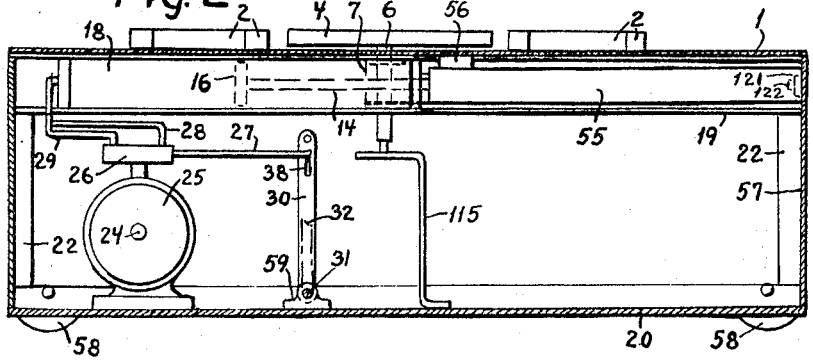
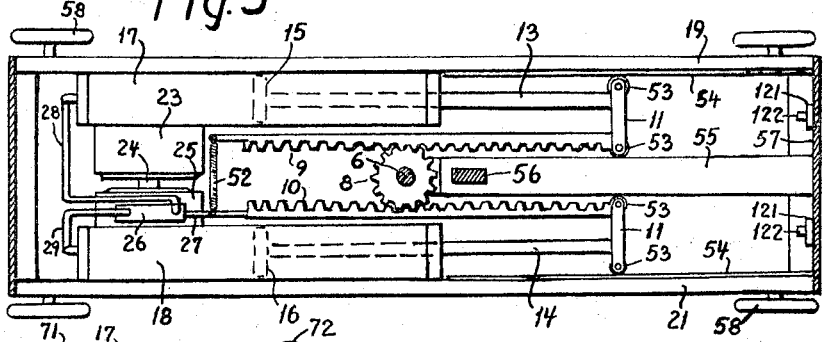
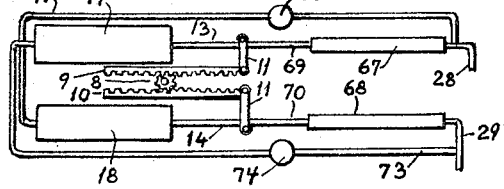
INVENTOR
Ove S. FREDERIKSEN
BY
ATTORNEY United States Patent Office 3,452,581
Patented July 1, 1969

3,452,581
MACHINE FOR BENDING TUBES OR RODS
Ove Steen Frederiksen, Sydvestvej 99, Glostrup, Denmark
Filed Sept. 23, 1966, Ser. No. 581,521
Int. Cl. B21d 9/05, 31/00; B21j 9/18
U.S. Cl. 72—388                                      9 Claims

ABSTRACT OF THE DISCLOSURE

This disclosure relates to a machine for bending tubes or rods comprising a table having a rotatable disk positioned thereon for receiving the tubes or rods. The disk is coupled to a shaft to which is fastened a gear wheel meshing with a rack driven by a hydraulic system. The movement of the rack in a predetermined direction is initiated by the operation of a handle which is automatively returned to a central position when the required amount of bending has been obtained.

---

Figure 4:
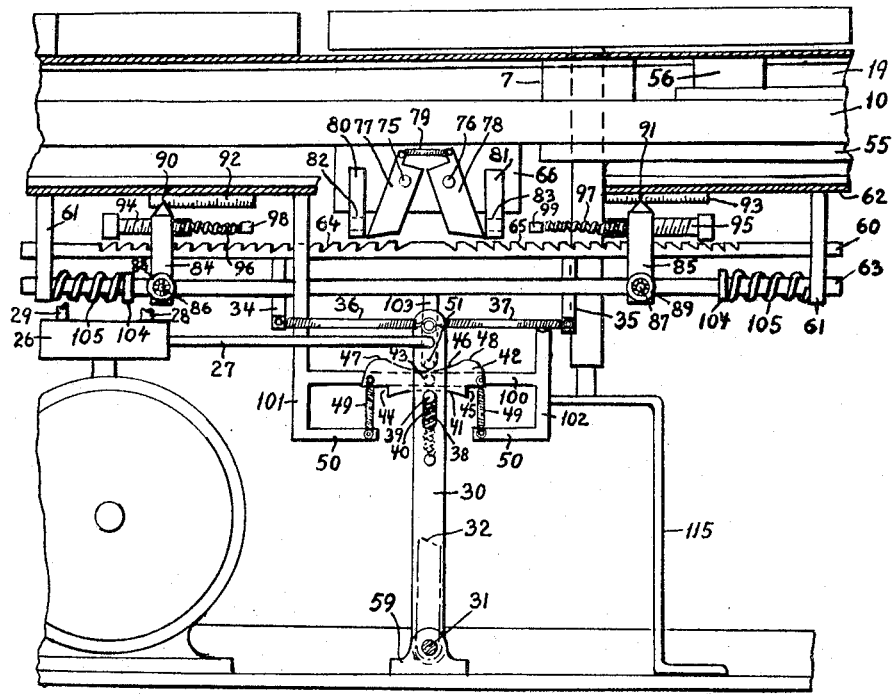

The present invention relates to a machine for bending tubes or rods, as for instance reinforcement rods used in reinforced concrete, and of the type comprising a table with several rows of holes, located in for instance in rails and in a rotatable disk above the table for the reception of holding devices. The rotatable disk is usually coupled to a shaft to which is fastened a gear wheel meshing with a rack which is connected to at least one piston rod in a possibly double-acting cylinder driven by means of a pressure medium.

The object of the present invention is to provide a machine of this type which is strong and works particularly well without being unduly strained and without overloading its power installations.

To this end, the machine in accordance with the present invention comprises two racks the adjacent sides of which mesh with the opposite sides of a gear wheel secured to the shaft of the rotatable disk. Each rack is connected to at least one piston rod located in a pressure medium cylinder having pressure regulation devices.

By this arrangement, well-balanced double-actions of the racks operating on the sturdy gear wheel located on the shaft of the rotatable disk are obtained without overloading the bearings of this shaft, and, with a rotatively small machine, strong bending torques may be obtained.

The machine in accordance with the present invention may be designed in such a way that each of its racks is connected to a piston rod secured to a piston in a pressure medium cylinder having a small diameter, and to a piston rod secured to a piston in a pressure medium cylinder having a large diameter and pressure medium regulation devices. By feeding the cylinders of small diameter with a pressure medium, one can make quick and easy bendings of, for instance, thin tubes or rods, while by feeding the cylinders of large diameter with pressure medium one can make heavier bendings of, for instance, thicker tubes or rods or the last part of a bending.

By designing the machine in accordance with the present invention in such a way that the cylinder of small diameter, the piston rod of which is connected to one of the two racks of the machine, is also connected to the cylinder of large diameter, the piston rod of which acts on the other of the two racks, by means of a pipe with a relief valve, there is obtained automatic feeding of pressure medium to the cylinder having a large diameter, when the small cylinder is about being overloaded, for instance by the last part of a bending.

The invention further relates to an apparatus well adapted for a safe conduction of the pressure medium to the cylinders of the machine for the operation thereof and for the automatic backward motion of the machine parts to the neutral position, in which no pressure medium is supplied to any of the cylinders of the machine. This is done in an easy way by means of a simple apparatus, as for example a lever and suitable valves for the pressure medium belonging thereto.

These and other objects of the machine in accordance with the present invention are more fully set forth and described in connection with the accompanying drawing, wherein—

FIG. 1 is a top view of an embodiment of the machine in accordance with the present invention, FIG. 2 illustrates parts of the same machine, seen partly in sectional longitudinal elevation, FIG. 3 illustrates parts of the same machine, seen partly in horizontal longitudinal section, FIG. 4 illustrates other parts of the machine, seen partly in sectional longitudinal elevation and on a larger scale, and FIG. 5 illustrates gear wheels, racks, cylinders and valves of another embodiment of the machine, seen from above and on a small scale.

The machine has a table 1, on which are fastened rails 2 with holes 3 each arranged to receive holding pins not shown. About the middle of the table 1 is disposed a rotatable disk 4 with holes 5 each arranged to receive holding pins in a known manner. The disk 4 is fastened to a shaft 6 which is journalled in bearings 7 under the table and which carries a gear wheel 8 which is fastened on the shaft 6.

This gear wheel meshes with racks 9 and 10 and one end of rack 9 or 10 is connected by means of a connecting piece 11 to the extreme end of piston rod 13 or 14 respectively, which is in turn connected to piston 15 or 16 in cylinder 17 or 18, fastened under the table 1. The other end of the racks 9 and 10 are mutually connected by means of a tension spring 52. The connecting pieces 11 have at each end a roller 53 which rolls respectively against guide bars 54 fastened in channel iron members 19 and 21 under the longitudinal edge parts of the table 1, and a guide bar 55, which is fastened under the table 1 at one end to connecting piece 56 and at the other end to the end wall 57 of the machine. The channel iron members 19 and 21 are resting against a corner angle iron member 22 on a bottom plate 20 having travelling wheels 58 located at the corners thereof.

On the bottom plate 20 stands a motor 23 having a shaft 24 connected to a known combined pump and oil tank 25. A three-way valve 26 is provided in which a rod 27 may be displaced for the conduction of oil back to the tank in a central position, for the conduction of oil from the pump through a pipe 28 to the cylinder 17 in one extreme position, and, in the other extreme position of the rod 27, for the conduction of oil from the pump through a pipe 29 to the cylinder 18.

The rod 27 is connected by means of joints to a bracket 30, FIGS. 2 and 4, on the same shaft 31 as a rod 32 with a handle 33, FIGS. 1, 2 and 4, outside the machine. The shaft 31 is journalled in a bearing 59 on the bottom plate 20. From two brackets 34 and 35 extending downwardly from a rod 60 two substantially identical tension springs 36 and 37 are attached to the bracket 30, which springs try to keep the bracket in the shown central position, FIG. 4. The rod 60 is displaceable in holes in bracket 61 extending downwardly from a plate 62 extending inwardly from the channel iron member 21 into the machine. Furthermore, a rod 63 is displaceable in holes in the bracket 61. The rod 60 has on its top surface two series of teeth 64 and 65 which are oppositely oriented. Downwards from the rack 10 extends a plate 66 with pins 75 and 76 holding rotatable detents 77 and 78, the upper ends of which are mutually connected by means of a tension spring 79. On the plate 66 there are secured brackets 80 and 81 having holes 82 and 83. On the rod 63 there are located brackets 84 and 85 which are displaceable and fixable by means of screws 86 and 87 with hand wheels 88 and 89 to be screwed through the brackets against the rod. The brackets 84 and 85 have pointers 90 and 91 at the top for pointing at the scales 92 and 93 which are fastened under the plate 62. Through holes in the brackets 84 and 85 are screwed hollow set screws 94 and 95 containing pressure springs 96 and 97 with ferrules 98 and 99 at their extreme ends.

The bracket 30 has an oblong guide hole for a displaceable pin 39 which one tries to keep in the position shown in FIG. 4 by means of a pressure spring 40 on the bracket 30. Above the pin 39 is located the upwardly arched surafce 41 of a two-arm rocking lever 42 which is rotatably supported by a pin 43 on a cross bar 100 positioned between bars 101 and 102 extending downwardly from the plate 62. From the lower ends of bars 101 and 102 also extend arms 50. Outside the surface 41 there are two notches 44 and 45 in the rocking lever 42. The latter has a curved surface 46 with two top surfaces 47 and 48. Each end of the rocking lever 42 is connected by means of a tension spring 49 to one of the arms 50. Extending downwardly from the bar 63 is a bracket 103 with a cross pin 51 resting against the surface 46.

The bending of material, as for instance bars or tubes positioned between the pins (not shown) in holes 3 and 5, takes place by rotation of the disk 4 and the shaft 6 by means of the gear wheel 8 and one of the racks 9 and 10, when a pressure medium is supplied to the corresponding cylinder 17 and 18 through the pipe 28 or 29 from the valve 26 and the pump 25.

This supply of pressure medium may be conducted in known manner by displacement of the rod 27 in the valve 26, for instance by means of the device particularly shown in FIG. 4. If the handle 33, the rod 32 and the bracket 30 are pushed to the left in the drawing, until the pin 39 is pressed into the notch 44 by the spring 40, the rod 27 is pushed far enough to the left in the valve 26 to supply the pressure medium through the pipe 29 to the cylinder 18 and cause the displacement of the rack 10 and rotation of the gear wheel 8 and the disk 4 and anti-clockwise and thus cause bending of a bar on the table 1.

In the same way, the rod 27 may be carried to the right in the valve 26, so as to supply the pressure medium through the pipe 28 to the cylinder 17 and by means of the rack 9 cause rotation of the gear wheel 8 and the disc 4 clockwise for bending a rod the other way when the bracket 30 is turned to the right and the pin 39 rests in the notch 45.

If the pin 39 is in the notch 44 and the rack 10 is displaced to the right in FIG. 4, the ferrule 99 passes through the hole 83, strikes against the detent 78 and tilts the same to mesh against one of the teeth 65, so that the rack 10 catches the rod 60 and the spring 97 is compressed until the bracket 81 strikes against the bracket 85 and the rod 63 is also caught. This puts the spring 37 under tension, until the pin 51 passes over the top surface 48 and presses it down to tilt the rocking lever 42 for releasing the pin 39 from the notch 44, whereupon the tightened spring 37 pulls the bracket 30 with the pin 39 back to the central position shown. The rod 27 is then carried back to the central position in the valve 26, in which the pressure medium from the pump 25 is returned to the tank. A pressure spring 105 is compressed to the right by the displacement of the rod 63 between a stop 104 on rod 63 and the bracket 61. The compressed spring 105 drives the rod 63 to the shown position against a corresponding pressure spring 105 at the other end of the rod 63, when the rack has been moved back. This takes place when the pumping of the pressure medium to the cylinder has stopped as stated above. The same cycle takes place when the bracket 30 is tilted to the other side and the pin 39 falls in the notch 45 and the rod 27 is so positioned in the valve 26 that the gear wheel 8 rotates the other way. In this way, bendings can be made in one direction or the other, and the size of these bendings can be adjusted by the scale 92 and 93.

In the embodiment shown in FIG. 5 there are shown, besides the cylinders 17 and 18 having a rather large diameter, two other cylinders 67 and 68 having a small diameter, to which the pipes 28 and 29 are led. The piston rods 69 and 70 of the cylinders 67 and 68 are connected respectively to an end of a rack 9 and 10 opposite to the piston rods 13 and 14 of the cylinders 17 and 18. Hereby a pressure medium is first conducted to one of the cylinders 67 or 68 for quick movement of the rack 9 or 10 at the start of a bending. If the movement of the rack 9 or 10 becomes so difficult that the pressure medium in the cylinder 67 or 68 cannot any longer push the rack forwards, the pressure rises in the cylinder 67 or 68 and the pressure medium will then flow from one of the pipe 28 and 29 through pipe 71 or 73 and an overload valve 72 or 74 in this pipe into the diametrically opposed cylinder 18 or 17. The piston and piston rod 14 or 13 will then cause the further displacement of the rack and the bending of a rod or a tube on the table 1.

On the wall 57 there is positioned at the end of the path of each connecting piece an electric switch 121 with a press button 122, against which the connecting piece 11 can strike in its extreme position and thus interrupt the electric current to the machine in a known manner. The cylinders may be double-acting and act each its way on each its rack.

I claim:
1. Machine for bending tubes or rods comprising:
  (a) a table having a rotatable disk positioned thereon, said table and disk having a plurality of rows of holes therein for the reception of holding devices for said tubes or rods;
  (b) a shaft coupled to said disk;
  (c) a gear wheel fastened to said shaft;
  (d) a toothed rack located on each side of said gear wheel and meshing therewith;
  (e) a piston rod connected to each rack;
  (f) at least two cylinders supplied with a pressure medium; and
  (g) a piston connected to each piston rod, each piston being movable in its respective cylinder under the action of said pressure medium.

2. Machine as defined in claim 1, wherein a first cylinder of small diameter and a second cylinder of large diameter having pressure regulation devices are connected to each piston rod.

3. Machine as defined in claim 2, further comprising a pipe and a relief valve interconnecting the cylinder of small diameter whose piston rod is connected to one of the racks with the cylinder of large diameter whose piston rod is connected to the other rack.

4. Machine as defined in claim 1, further comprising a valve and a rod movable in said valve for controlling the flow of pressure medium to said cylinders;
  a bracket secured at one end to said movable rod and at its other end to the machine, said bracket being movable from a central position;
  a spring loaded pin on said bracket;
  a rocking lever secured to said machine, said rocking lever having a notch therein for engagement with said spring loaded pin when said bracket is moved in a predetermined direction; and
  means for rocking said lever for releasing said spring loaded pin engaged in said notch to permit said bracket to return to its neutral position in which no pressure medium is supplied to the cylinders.

5. Machine as defined in claim 4, wherein the means for rocking the lever include a second rod adapted to be displaced by the rack, said second rod having an adjustable stop member thereon contacting a cooperating stop member located on the racks; and
  a pin moutned on said second rod, said pin being displaced over the top surface of the rocking lever when said rack is moved to cause the rocking lever to tilt and release the spring loaded pin.

6. Machine as defined in claim 5, further including an adjustable hollow screw located on the stop member of the second rod, said hollow screw having a pressure spring positioned therein and terminated by a ferrule;
a third toothed rod mounted on said machine;
pivotable detents mounted on said rack, said ferrule engaging said pivotable detents when the rack has moved a predetermined distance to press said detent against said third toothed rod;
bracket members extending from said third rod; and spring means secured at one end to said bracket members and at the other end to said bracket for returning said bracket to its central position.

7. Machine as defined in claim 6, further comprising a spring mounted at each end of the third rod to bias the same to a central position.

8. Machine as defined in claim 1, further including a tension spring attached to the ends of the racks opposite to the ends secured to the piston rods for tensioning said racks against said gear wheel.

9. Machine as defined in claim 1, further including a connecting piece for connecting each rack to each piston rod, guide rollers at each end of said connecting piece and guide rails on said machine for receiving said guide rollers.

References Cited

UNITED STATES PATENTS

| | | | |
|---|---|---|---|
| 157,693 | 12/1874 | Murphy | 72—387 |
| 311,942 | 2/1885 | Burns | 72—388 |
| 1,512,002 | 10/1924 | Kardong | 72—388 |
| 1,795,188 | 3/1931 | Wagenbach | 72—388 |
| 1,903,799 | 4/1933 | Wagenbach | 72—388 |
| 2,055,955 | 9/1936 | Wagenbach | 72—388 |
| 3,126,770 | 3/1964 | Wuppermann | 72—420 |

CHARLES W. LANHAM, Primary Examiner.

G. P. CROSBY, Assistant Examiner.

U.S. Cl. X.R.

72—449, 453